March 2, 1954   H. G. CONWAY   2,670,715
FOLLOW-UP TYPE FLUID SERVOMOTOR
Filed Feb. 23, 1949   3 Sheets-Sheet 3

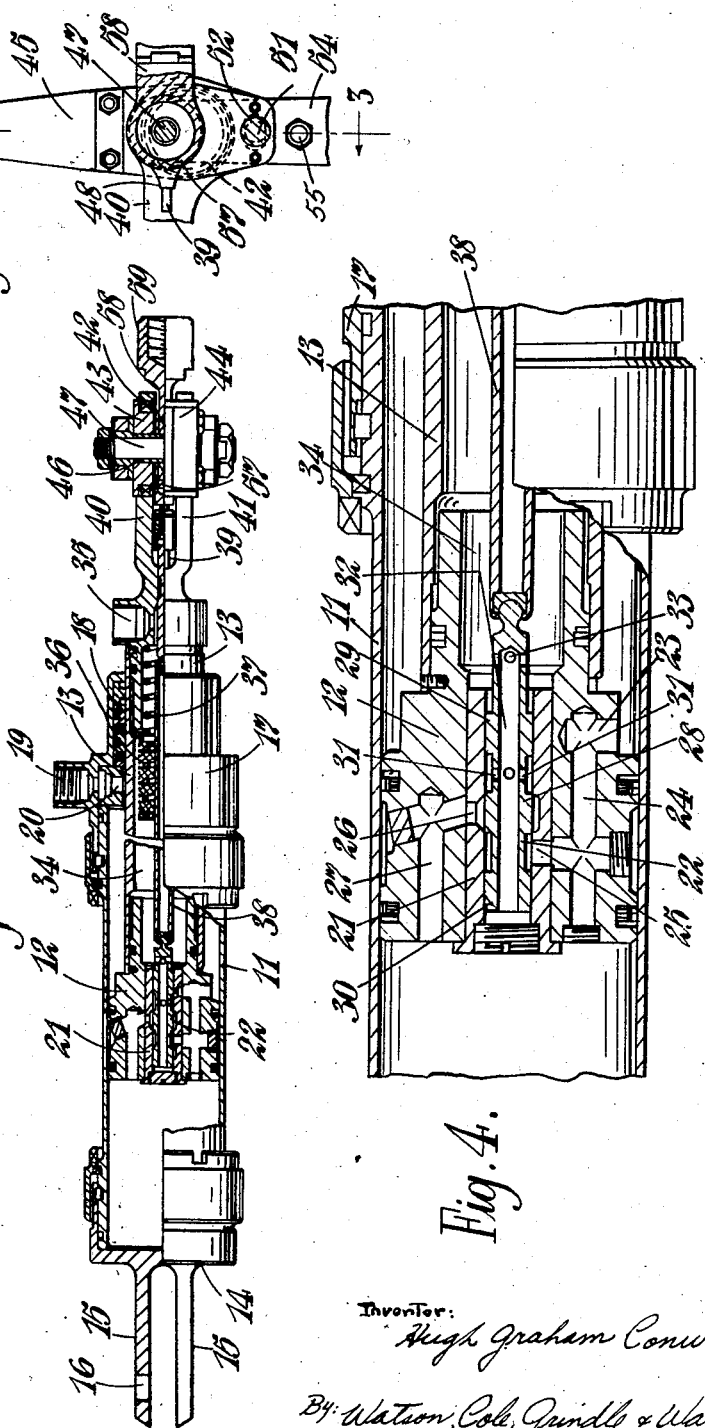

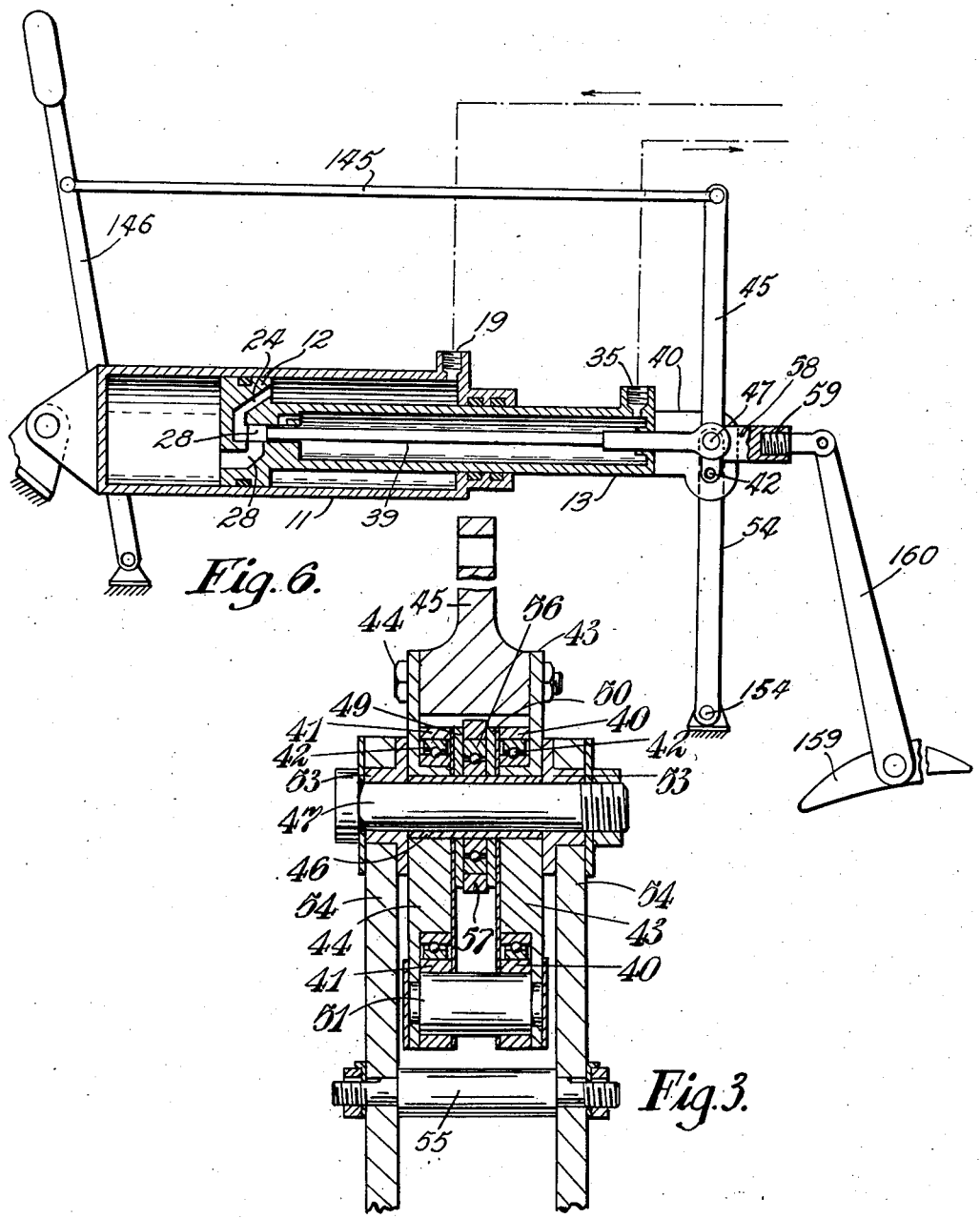

Inventor:
Hugh Graham Conway
By: Watson, Cole, Grindle & Watson
Attys.

Patented Mar. 2, 1954

2,670,715

UNITED STATES PATENT OFFICE 2,670,715

FOLLOW-UP TYPE FLUID SERVOMOTOR

Hugh Graham Conway, Gloucester, England, assignor to British Messier Limited, Gloucester, England, a British company Application February 23, 1949, Serial No. 77,901

Claims priority, application Great Britain February 23, 1948

2 Claims. (Cl. 121—41)

This invention comprises improvements in fluid-operated servo-motors and is particularly directed to servo-motors of the piston and cylinder type wherein the distribution of pressure fluid to the opposed faces of the piston is governed by a servo-valve, movement of which controls the direction of motion of the piston.

The use of such a servo-motor associated with a servo-valve is well-known and in particular is widely employed in hydraulic flying controls for aircraft, being primarily designed to enable the pilot of a large aircraft to fly at high speed, when the efforts required to move the control surfaces are greater than he can conveniently exert manually. In previous installations the flying control servo-motor or jack and the governing servo-valve manually operated by the pilot have been separate units connected by conduits for the passage of the working fluid and a valve installed in this manner is susceptible to leakage and is difficult to protect against the entry of dirt.

The present invention contemplates the location of the servo-valve within the piston itself with an operating member extending therefrom to the exterior of the jack.

A jack or servo-motor according to the invention presents definite advantages over other systems so far produced in that external valve connections and leak paths to atmosphere are eliminated and the valve may be protected from dirt far more easily thus providing one of the fundamental requirements for long life. Also the installation and mechanical linkage is much simpler and any developments which lead to a simplification of aircraft controls is of paramount importance.

Such a servo-motor is particularly suited for use as a hydraulic jack for operating aircraft flying control surfaces and for this service the body of the jack is locked to the fixed aircraft structure and the piston rod is coupled to the movable flying control surface while the pilot's control is connected to the lever arm to operate the valve.

These and further features of the invention will become apparent from the following description which is given by way of example of one embodiment of the invention in a practical form applied to the control of aircraft flying control services, references being made to the accompanying drawings in which:

Figure 1 is a longitudinal horizontal section through a jack in accordance with the invention;

Figure 2 is a side elevation of the connection of a control lever to the jack piston rod;

Figure 3 is a section upon the line 3—3 of Figure 2 looking in the direction of the arrows;

Figure 4 is a detail to an enlarged scale of a portion of the parts shown in Figure 1;

Figure 6 is a diagrammatic general view of the assembly of servo-motor pilot control and control element of the aircraft.

Figure 5:
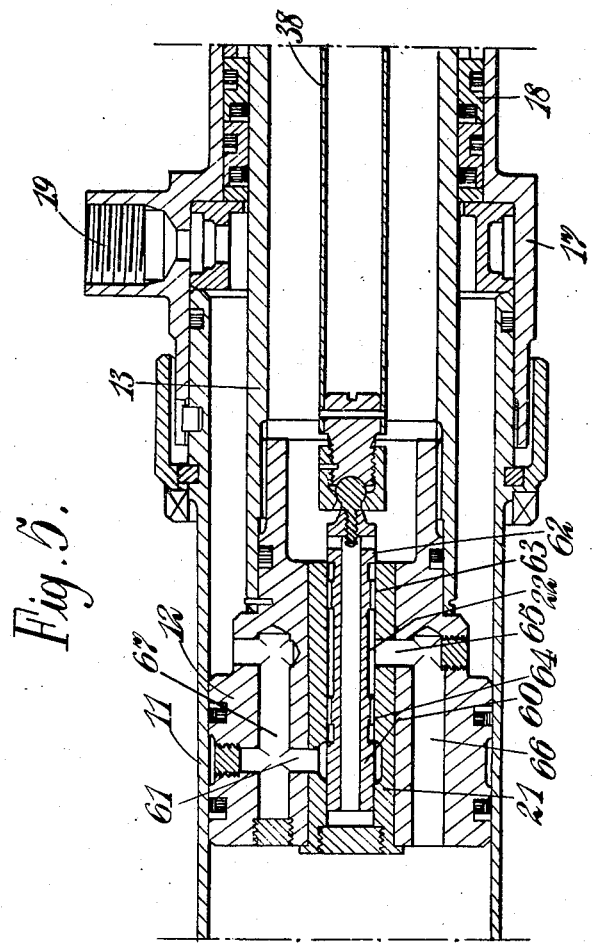
Figure 5 is a detail similar to Figure 4 of an alternative construction.

Referring to Figure 1 a hydraulic servo-motor is shown which comprises a cylinder 11 in which works a piston 12 operating upon a hollow piston rod 13. The cylinder 11 has a head 14 which carries ears 15 pierced at 16 to provide eyes for attachment to an anchorage which may be a fixed part of an aircraft. At the other end of the cylinder 11 is a head 17 which contains a stuffing gland 18 surrounding the rod 13. The head 17 has a pipe connection 19 in the side for connection to a high pressure hydraulic supply. The connection 19 opens through a port 20 into the interior of the cylinder 11 around the piston rod 13 and tends to urge the piston 12 normally inwards, that is toward the head 14. Within the piston 12 is a liner 21 containing a bore, coaxial with the piston, in which works a piston-valve 22. The piston-valve 22 and associated parts can be more readily seen in the detail, Figure 4 of the drawing. A port 23 in the piston 12 admits fluid under pressure from the space around the piston rod 13 to a passage 24 in the piston 12 and thence to a port 25 in the liner 21. The piston-valve 22 controls a port 26 opening on to a passage 27 in the piston 12 which leads to the space between the piston and the head 14. The portion 28 of the piston-valve 22 which normally lies opposite the said port is made of the same diameter as the bore of the liner 21 and of the same length in an axial direction as the mouth of the port 26 on the inner side of the liner. On each side of the port 26 the piston-valve 22 has portions of reduced diameter and beyond the portions of reduced diameter it has guided portions 29, 30 which are of the same diameter as the bore of the liner and which serve to keep the operative portion 28 of the valve centralised in the bore notwithstanding the great difference of pressure which may at times exist around the valve between the port 25 and the port 26. It will be appreciated that on aircraft the hydraulic pressure may be of the order of 2,000 lbs. per square inch and that if any appreciable portion of the enlarged section 28 of the valve 22 were in contact with the bore of the liner 21 this pressure would tend to force the valve to one side in the bore of the liner 21 and to cause it to jam in the bore and to prevent easy movement of the valve, but the guide portions 29, 30 tend to keep it central and, the central portion 28 of the valve being scarcely any longer than the port 26, sticking is prevented.

To the right of the portion 28 of the valve 22 as viewed in Figure 4 of the drawing the valve is provided with ports 31 which communicate with a hollow bore 32 within the valve and the hollow bore extends through the valve to a port 33 which communicates with the hollow space 34 within the hollow piston rod 13. The space 34 extends through the piston rod to a pipe connection 35 on the end of the piston rod outside the stuffing gland 18 which pipe connection can be coupled by a flexible pipe to a sump, that is to say to a fluid reservoir at atmospheric pressure to which the hydraulic operated fluid can be exhausted. A filter gauze 36 of hollow cylindrical formation is provided within the piston rod 13 and is held distended by a spring 37 (Figure 1).

It will be seen that if the valve 22 is moved to the left from the position shown in Figure 4 the space between the piston 12 and the head 14 of the servomotor will be connected by way of the ports 31, 33 and space 34 to exhaust and the hydraulic pressure between the head 17 and the piston 12 will force the piston rod to move to the left. If the valve 22 on the other hand is moved to the right from the position shown in the figure the exhaust will be cut off and the space between the piston 12 and the head 14 will be connected by way of the ports 23, 25 and port 26 to the hydraulic pressure existing around the piston rod 13 and as the area of the piston which lies to the left as viewed in Figures 1 and 4 is greater than the annular area surrounding the piston rod 13, the piston and piston rod will be forced to the right. In the central position a state of balance will be set up, the leakage between the edges of the portion 28 of the valve serving to maintain an intermediate pressure to the left of the piston which will balance the full pressure existing to the right of the piston.

The valve 22 is controlled by an operating rod 38 which extends through the hollow piston rod 13 past the pipe connection 35 to the exterior as indicated at 39. The piston rod 13 is here forked into two branches 40, 41 and the fork-ends surround ball races 42 in which rock two side members 43, 44 forming part of a control lever 45. These parts are best seen in Figure 3 of the drawing. The ball races 42 are large enough in internal diameter to permit the operating lever branches 43, 44 to be drilled eccentrically to receive a bush 46 forming a bearing for a pivot pin 47. The centre of the pin 47 is above the axis of the ball bearings 42 as viewed in Figures 2 and 3 of the drawing and therefore movement of the lever 45 to the right in Figure 2 will carry the pin 47 with it to the right. As can be seen in Figure 2 of the drawing the fork arms 40, 41 of the piston rod 13 are off-set downwards where they surround the ball races 42 and the amount of this off-set is sufficient to bring the axis of the pin 47 into line with the centre of the piston rod. The operating member 38 of the servo-valve is connected at 39 to a forked head 48 which lies between the arms 40, 41 of the forked head of the piston rod and the forked head 48 has fork arms 49, 50 which work on the bush 46 surrounding the pin 47. Therefore movement of the lever 45 to the right in Figure 2 will move the valve 22 to the right. This causes the piston 12 and piston rod 13 to move to the right and as soon as the movement equals the movement of the lever the valve is closed again and the movement stops. The same applies if the lever is moved to the left. Thus a servo action is obtained.

The lever sides 43, 44 extend below the ball races 42 and the fork arms 40, 41 also extend below the races and carry a pin 51, the ends of which work in horizontal slots 52 in the bottom end of the lever. The pin limits the lateral movement of the lever.

The pin 47 is extended beyond the bush 46 at each side and carries L-section washers 53 on which work suspension links 54. The suspension links 54 are bolted together by a bolt 55 below the lever 45 and they extend downwardly to a pivot pin on the aircraft (Figure 6). They serve to guide the movement of the forked end 40, 41 of the piston rod 13. Upon the bush 46 is a central ball race 56 which lies between the fork arms 49, 50, and surrounding the ball race 56 is an eye 57 of a connecting member 58 which has a screwed shank 59. The screwed shank 59 is adapted to be connected to any element which the servomotor may be installed to operate, for example the flap 159, Figure 6, operated by lever 160.

Referring now to Figure 5 this shows parts which in general are the same as corresponding parts of Figures 1 and 4 and are similarly numbered so that detailed description is unnecessary. The difference is that the piston-valve 22 instead of operating with the central land 28 to control both inlet and exhaust is provided with an enlarged portion or land 60 at one end to control the admission of pressure fluid from a port 61 in the liner 21 to the space around the central portion of the piston valve and with an enlarged portion 62 at the other end which co-operates with the end of the bore of the liner 21 to control exhaust. The intermediate portion of the piston-valve between the enlarged portions 60, 62 is of smaller diameter to permit the passage of fluid and is provided with two guide portions 63, 64. The guide portions 63, 64 are a close internal fit in the liner 21 but they are grooved at intervals around their periphery in a longitudinal direction to permit the passage of the hydraliuc fluid to a port 65 in the center of the liner and thence by a passage 66 to the space lying to the left of the piston 12. The valve is maintained concentric with the bore by the portions 63, 64 and the enlarged portions 60, 62, not being normally entered in any part of the bore of the liner 21 which is subject to pressure, do not tend to cause sticking of the valve. The port 61 is connected by a passage 67 to the pressure space surrounding the piston rod 13.

The amount of "feel" which the pilot requires in lever 45 can be adjusted to suit any requirement by varying the length of the lever.

Referring to Figure 6, the control lever 45 is shown connected by a rod 145 to an operator's control handle 146. Hydraulic pressure is continuously supplied at 19 and at 35 the outlet is continuously open to exhaust. In operation, if the control lever 45 is moved to the right, as viewed in the drawing, the valve 28 is moved to the right. This is because the control lever 45 pivots about the center (indicated at 42 in the drawing) of the ball races on which the lever 45 is mounted and thereby carries the pin 47 to the right. The result is that the valve 28 opens communication between passage 24 and passage 27 and thereby connects the space in cylinder 11 which is to the right of piston 12 to the space which is to the left thereof. As already explained, this causes the piston rod 13 to move to the right and the controlled element 159 is thereby actuated. When movement of the lever 45 by the operator ceases, it closes the valve 28 and movement of the element 159 ceases. In the course of the whole movement, as will be observed from the drawing, the operator has to maintain pressure on the lever 45 which is proportional to the resistance to movement of the element 159 because the force required to move the element 159 is applied to the element 59 by the piston rod 13 at the point 42 of lever 45 and is transmitted by the lever to the element 59 through the pin 47. As the pin 47 is at a different center from the center 42 about which the lever 45 turns, there is a reaction on the end of the lever which the operator can feel at the handle. In other words, he has the "feel" of the force necessary to move the controlled part. As soon as he ceases to push on the lever 45 the piston rod 13 catches up with the movement and the valve 28 closes the passages 24, 27, thus holding the controlled element 159 in the position which it has attained.

If the operator wishes to move the control element 159 back again he moves the lever 146 in the opposite direction which opens the passage 27 to the space within the piston rod 13 and thus to the exhaust 35 allowing the piston 12 to move to the left and follow the movement of the lever 45 until it catches up again. In so doing the operator can feel the force exerted on the controlled element 159 for the same reason as already explained, namely, that the center 47 where the force is exerted on the controlled element is not at the same point on lever 45 as the pivotal center 42 of the lever.

Thus a power movement is effected in both directions although there are only two connections, 19, 35, to the servomotor and owing to the extremely small movement required to unbalance the pressure by flow of fluid through valve 28 there is no "back-lash," that is to say the movements of the control surface follow the movements of the operating lever with great closeness.

I claim:

1. In a servo-motor the combination of a motor cylinder having means for attachment to an aircraft, an assembly comprising a piston and piston-rod of which the piston fits the cylinder and the rod passes through one end of the cylinder and contains an exhaust passage, a sliding control valve within the assembly, parts to said valve which in one position thereof open connection between opposite sides of the piston and in another position thereof open connection between the side of the piston remote from the piston-rod and the exhaust passage, a fluid supply connection to the end of the cylinder which surrounds the piston-rod, a lever pivoted on the outer end of the piston-rod, a valve-operating rod operatively connected at one end to the valve and at the other end to the lever near to its pivot and an operative connection from a point on the lever close to its pivot to the load.

2. In a servo-motor the combination of a motor cylinder having means for attachment to an aircraft, an assembly comprising a piston and piston-rod of which the piston fits the cylinder and the rod passes through one end of the cylinder and contains an exhaust passage, a fluid supply connection to the end of the cylinder which surrounds the piston rod, a sliding control-valve within the assembly, parts in the assembly controlled by said valve which in one position thereof open connection between opposite sides of the piston and in another position thereof open connection between the side of the piston remote from the piston-rod and the exhaust passage, a lever pivoted on the outer end of the piston-rod at a point offset from the center line thereof, a valve-operating rod pivoted to the lever at a point approximately on said center line, an operative connection also approximately on said center line from the lever to the load, and a supporting link pivoted at one end to the lever and at the other end to a point of support on the aircraft.

HUGH GRAHAM CONWAY.

References Cited in the file of this patent
UNITED STATES PATENTS

| Number | Name | Date |
|---|---|---|
| 773,365 | Atkins | Oct. 25, 1904 |
| 2,152,084 | Paine | Mar. 28, 1939 |
| 2,227,273 | Price | Dec. 31, 1940 |
| 2,424,901 | Richolt | July 29, 1947 |
| 2,437,536 | Johnson et al. | Mar. 9, 1948 |
| 2,449,400 | Lindsey | Sept. 14, 1948 |
| 2,457,721 | Price | Dec. 28, 1948 |
| 2,462,994 | Price | Mar. 1, 1949 |
| 2,472,547 | Purcell | June 7, 1949 |
| 2,503,956 | Lisle | Apr. 11, 1950 |

FOREIGN PATENTS

| Number | Country | Date |
|---|---|---|
| 344,037 | Great Britain | Mar. 2, 1931 |